UNITED STATES PATENT OFFICE.

OTTO FRIZ, OF NUREMBERG, GERMANY, ASSIGNOR TO C. A. KAPFERER AND WILHELM SCHLEUNING, OF MUNICH, GERMANY.

PROCESS OF MAKING CEMENT.

SPECIFICATION forming part of Letters Patent No. 698,268, dated April 22, 1902.

Application filed November 15, 1899. Serial No. 737,078. (No specimens.)

*To all whom it may concern:*

Be it known that I, OTTO FRIZ, a subject of the German Emperor, residing at Nuremberg, Germany, have invented a new and useful Improvement in Processes of Making Cement, of which the following is a specification.

This invention has for its object the manufacture of a cement which by avoiding the ordinary dull gray color is especially suitable for decorative purposes, artificial stone, and the like. For this object a clay which is free from iron (kaolin, pipe-clay, and the like) is mixed with feldspar, (orthoclase or its equivalent,) which is also as free as possible from iron, and with lime, which must of course also be as free from iron as possible. The mixture of kaolin and feldspar before mentioned may be regulated in such a way that the high fusing temperature caused by the absence of iron compounds and alkalies and also the too high alumina contents caused by the introduction of the kaolin are reduced and may be confined to the conditions proved to yield the best cement. The mixture is treated with the necessary amount of lime in the manner usual in cement-making and yields when burned to the fusing-point—that is, beyond the sintering limit—a product which hardens equal to the best cement.

As example for a favorable combination the following figures serve, and, in fact, raw material may be prescribed as follows: a normal kaolin with forty-seven per cent. $SiO_2$, thirty-nine per cent. $Al_2O_3$, fourteen per cent. $H_2O$, total one hundred; normal plagioclase (Albit) with 68.68 per cent. $SiO_2$, 19.48 per cent. $Al_2O_3$, 11.84 per cent. $Na_2O$, total one hundred. If these stuffs are mixed in the proportion of four to six, respectively, a material will be obtained of the combination 60.008 per cent. $SiO_2$, 27.288 per cent. $Al_2O_3$, 7.104 per cent. $Na_2O$, 5.600 per cent. $H_2O$, total, one hundred. By addition of carbonate of lime (limestone) a crude meal is combined of the following nature: 15.002 per cent. $SiO_2$, 6.822 per cent. $Al_2O_3$, 1.776 per cent. $Na_2O$, 1.400 per cent. $H_2O$, 75.000 per cent. $CaCO_3$, total one hundred, which corresponds to a cement of 22.868 $SiO_2$, 10.400 $Al_2O_3$, 2.707 $Na_2O$, 64.025 CaO. If now the brick is burned to the usual sintering, thus to a quality resembling pumice-stone, the result is similar to Roman cement, however, like the above described, of clear material.

The proportions of the ingredients of the cement result from the proportions of the crude meal as follows, to wit: The proportions of course change by firing, the water and the carbonic acid being expelled, so that, for instance, out of one hundred parts of carboniferous limestone fifty-six parts of oxid of calcium are produced and forty-four parts of carbonic acid are expelled. The mixture of the crude meal given above will lose by firing 34.4 per cent. of water and thirty-three per cent. of carbonic acid out of the seventy-five per cent. of carboniferous limestone, ($CaCo_3$.)

I claim—

The process of manufacturing white cement, consisting in the admixture of lime and clay as free as possible from iron, together with feldspar, in about the proportions stated, and burning the resultant mass to the verge of fusing, that is to say, beyond the sintering limit.

In testimony whereof I affix my signature in presence of two witnesses.

OTTO FRIZ.

Witnesses:
 HEINRICH FIRTH,
 OSCAR BOCK.